(12) United States Patent
Chang et al.

(10) Patent No.: US 7,428,415 B2
(45) Date of Patent: Sep. 23, 2008

(54) METHOD OF MANAGING INFORMATION ABOUT MOBILE TERMINAL IN A MOBILE COMMUNICATION SYSTEM SUPPORTING HIGH-RATE DATA TRANSMISSION

(75) Inventors: Yong Chang, Songnam-shi (KR); Nae-Hyun Lim, Seoul (KR); Bill Semper, Richadson, TX (US)

(73) Assignee: Samsung Electronics Co., Ltd (KR)

( * ) Notice: Subject to any disclaimer, the term of this patent is extended or adjusted under 35 U.S.C. 154(b) by 1180 days.

(21) Appl. No.: 10/308,757

(22) Filed: Dec. 3, 2002

(65) Prior Publication Data
US 2004/0203771 A1 Oct. 14, 2004

(30) Foreign Application Priority Data
Jun. 3, 2002 (KR) ............... 10-2002-0031187

(51) Int. Cl.
*H04Q 7/20* (2006.01)
*H04M 3/42* (2006.01)
*H04B 7/00* (2006.01)
*H04Q 7/00* (2006.01)

(52) U.S. Cl. ............ 455/435.1; 455/414.1; 455/458; 370/310; 370/331

(58) Field of Classification Search ........... 370/338, 370/310, 331; 455/432, 436, 435.1, 414.1, 455/426.1, 426.2, 458, 432.1
See application file for complete search history.

(56) References Cited

U.S. PATENT DOCUMENTS

| | | | |
|---|---|---|---|
| 6,704,295 B1 * | 3/2004 | Tari et al. ............ | 370/270 |
| 7,336,628 B2 * | 2/2008 | Chang et al. ......... | 370/310 |
| 7,356,339 B2 * | 4/2008 | Nam ................... | 455/436 |
| 2002/0026482 A1 * | 2/2002 | Morishige et al. ..... | 709/206 |
| 2002/0193110 A1 * | 12/2002 | Julka et al. ........... | 455/432 |
| 2004/0203771 A1 * | 10/2004 | Chang et al. .......... | 455/435.1 |

FOREIGN PATENT DOCUMENTS

| | | |
|---|---|---|
| KR | 1020010046483 | 6/2001 |
| KR | 1020030005750 | 1/2003 |
| KR | 1020030084094 | 11/2003 |
| KR | 1020030089363 | 11/2003 |

* cited by examiner

*Primary Examiner*—Tilahun B Gesessse
(74) *Attorney, Agent, or Firm*—The Farrell Law Firm, PC

(57) ABSTRACT

A method of managing the session information of an AT in a CDMA2000 1xEV-DO system. In the 1xEV-DO system, a service system, having an SC/MM, is connected to a PDSN, a plurality of ANs are connected to the service system, and a plurality of ATs are capable of wireless communication with the ANs. In the session information managing method, an AN transmits to the SC/MM a session retrieve request message, upon receipt of a connection request message from the AT. The SC/MM then searches for session information of the AT and transmits to the AN a session retrieve response message including the session information. Upon receipt of the session retrieve response message, the AN transmits a connection response message to the AT.

15 Claims, 5 Drawing Sheets

METHOD OF MANAGING INFORMATION ABOUT MOBILE TERMINAL IN A MOBILE COMMUNICATION SYSTEM SUPPORTING HIGH-RATE DATA TRANSMISSION

PRIORITY

This application claims priority to an application entitled "Method for Managing Information about Mobile Terminal in a Mobile Communication System Supporting High-Rate Data Transmission" filed in the Korean Industrial Property Office on Jun. 3, 2002 and assigned Serial No. 2002-31187, the contents of which are incorporated herein by reference.

BACKGROUND OF THE INVENTION

1. Field of the Invention

The present invention relates generally to information management in a mobile communication system, and in particular, to a method for managing information about a mobile terminal in a mobile communication system.

2. Description of the Related Art

In general, a mobile communication system was deployed to provide a wireless voice call with mobility. User demands and the development of mobile communication technology have developed the mobile communication system to additionally provide short data service. Thus besides the basic voice service, the mobile communication system provides SMS (Short Message Service), transfer of an audio file to be used as ring sound, simple Internet service, and mobile banking and finance.

At present, a system for providing more data at high speed to mobile subscribers is being discussed for common use. The system is called CDMA2000 1xEV-DO (Evolution-Data Only). To transmit data at high speed to a mobile terminal, the 1xEV-DO system uses different channels from those in existing systems. Accordingly, a data channel for delivering data at high speed, a supplemental channel, a signaling channel, and a MAC (Medium Access Control) channel were defined and the structures of the channels and the standards of data delivered on the channels have been discussed.

As it has been developed as a high-rate data transmitting system, the 1xEV-DO system is very different in signaling and network configuration from CDMA2000 1x (hereinafter referred to as 1x) that provides mainly voice service. In the 1x system, information about mobile terminals is stored in an HLR (Home Location Register) and a VLR (Visitor Location Register) in an MSC (Mobile Switching Center) reads information about a particular mobile terminal from the HLR and temporarily stores it. Therefore, the MSC authenticates a mobile terminal if the mobile terminal is registered in the VLR. If the mobile terminal is not registered in the VLR, the MSC requests information about the mobile terminal from the HLR.

Meanwhile, no switching entity exists in the 1xEV-DO system, which means that mobile information is neither maintained nor updated in the same manner as in the existing systems focusing on voice service only. Yet, mobile authentication and mobile information are essential in the sense that data transmission to a mobile terminal is impossible without knowing the location of the mobile terminal or its ID (Identification) such as a telephone number. Moreover, when the mobile terminal is to transmit data, its authentication cannot be performed without management of its ID.

SUMMARY OF THE INVENTION

It is, therefore, an object of the present invention to provide a method of managing information about a mobile terminal in a mobile communication system supporting high-rate data transmission.

It is another object of the present invention to provide a method of updating information about a mobile terminal in a mobile communication system supporting high-rate data transmission.

It is a further object of the present invention to provide a method of managing information about a mobile terminal without loss of continuity in a mobile communication system supporting high-rate data transmission.

To achieve the above and other objects, in a CDMA2000 1xEV-DO system, a service system, having an SC/MM (Session Controller/Mobility Manager), is connected to a PDSN (Packet Data Serving Node), a plurality of ANs (Access Networks) are connected to the service system, and a plurality of ATs (Access Terminals) communicate with the ANs via wireless transmission. In a session information managing method in the system, an AN transmits to the SC/MM a Session Retrieve Request message, upon receipt of a Connection Request message from the AT. The SC/MM then searches for session information of the AT and transmits to the AN a Session Retrieve Response message including the session information. Upon receipt of the Session Retrieve Response message, the AN transmits a Connection Response message to the AT.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Hereinafter, a mobile communication system supporting high-rate data transmission will be described as a 1xEV-DO (HRPD: High Rate Packet Data) system. As used herein, "session" is defined as all information used or information required for an AT (Access Terminal) to set up and maintain a call on a radio link or within the system. For example, the session can be information required to transmit a signal message on an access channel, that is, an access channel authentication parameter, the sequence number of the signal message, a keep alive timer value necessary to extend and maintain the session, QoS (Quality of Service) information, and a permanent number assigned to the AT in the system.

Figure 1:
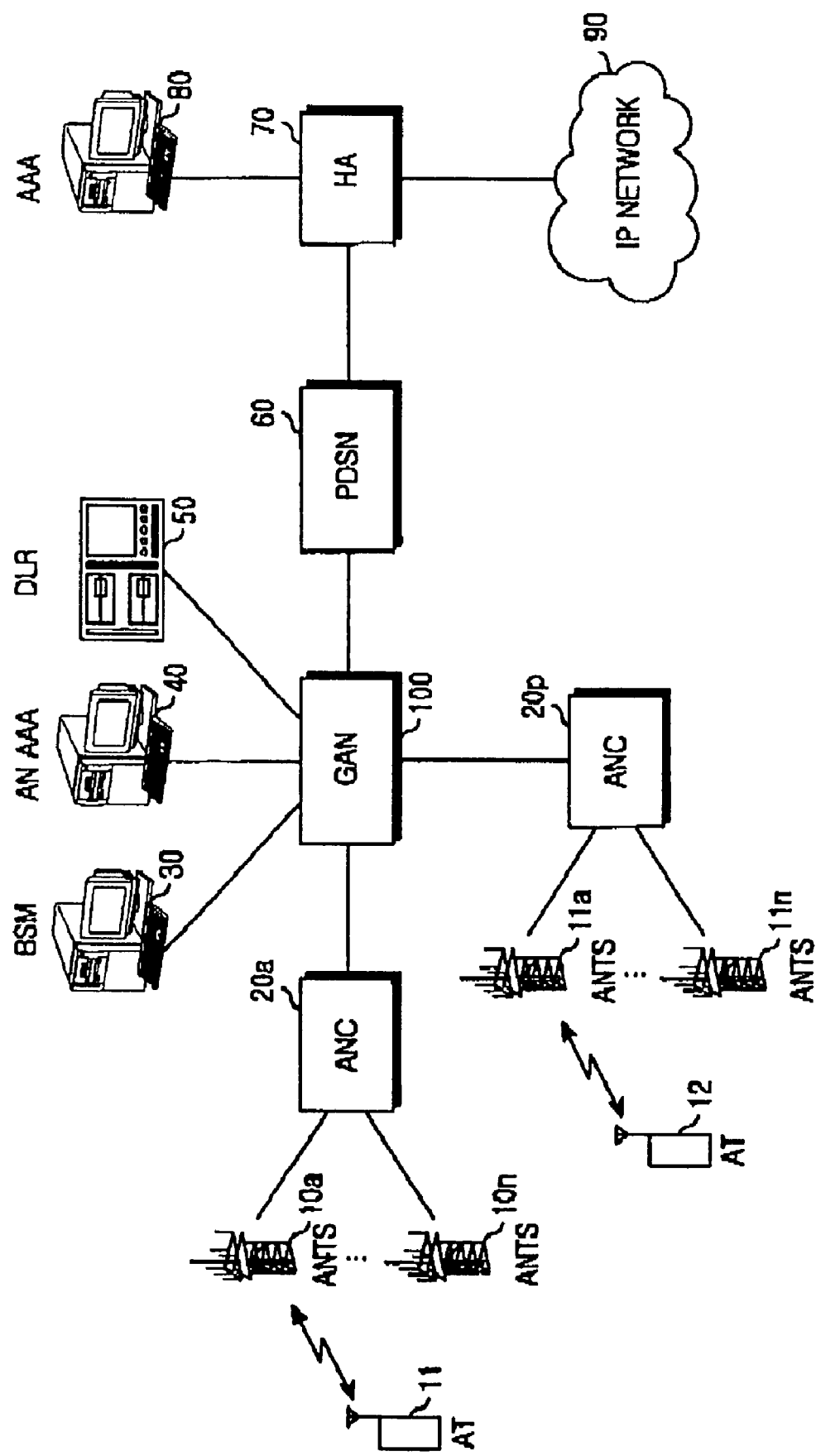
FIG. 1 illustrates the overall structure of a mobile communication system supporting high-rate data transmission.

FIG. 1 illustrates the overall structure of a mobile communication system supporting high-rate data transmission. Referring to FIG. 1, ATs 11 and 12 exchange data at high speed with ANTSs (Access Network Transceiver Systems) 10a to 11n via radio channels based on 1xEV-DO standards. The ANTSs 11a to 11n are connected to ANCs (Access Network Controllers) 20a and 20p and perform data processing, authentication, and related signaling for ATs 11 and 12. Hereinafter, an ANTS and an ANC will collectively be referred to as an AN (Access Network). An AN can be used in the sense of an ANTS or in the broad sense of an ANC and ANTSs connected to the ANC. In the present invention, the term "AN" covers both cases. The ANs are connected to a GAN (General ATM switch Network) 100 by a cable. Thus, the ANs communicate data with a PDSN (Packet Data Serving Node) 60 through the GAN 100.

The GAN 100 controls transmission of packet data to ATs 11 and 12 through its PCF (Packet Control Function) (not shown), and forwards data received from ATs 11 and 12 to PDSN 60 after processing. On a rear wired link of the GAN 100, data is transmitted on a packet basis irrespective of processing on a front wired link of the GAN 100.

The GAN 100 is also connected to a BSM (Base Station Manager) 30, an AN AAA (Access Network Authentication, Accounting, and Authorization) 40, and a DLR (Data Location Register) 50. The BSM 30 manages the states of the ANCs 20a and 20p in hardware and software, monitors the operations of the ANs, and collects statistic materials. The AN AAA 40 performs an authentication process for the ATs 11 and 12. The DLR 50, functioning like an HLR in a 1x system providing mainly voice service, provides the location information of an AT upon receipt of a location information request for the AT from the GAN 100. The DLR 50 is also called an SC/MM (Session Controller/Mobility Manager). The DLR 50 may be built outside the GAN 100, or integrated into the PCF of the GAN 100.

The PDSN 60 is connected to an AAA 80 for authenticating a packet data service for an AT though an HA (Home Agent) 70 that manages information about ATs. The HA 70 is also connected to an IP (Internet Protocol) network 90, for processing data by IP.

Figure 2:
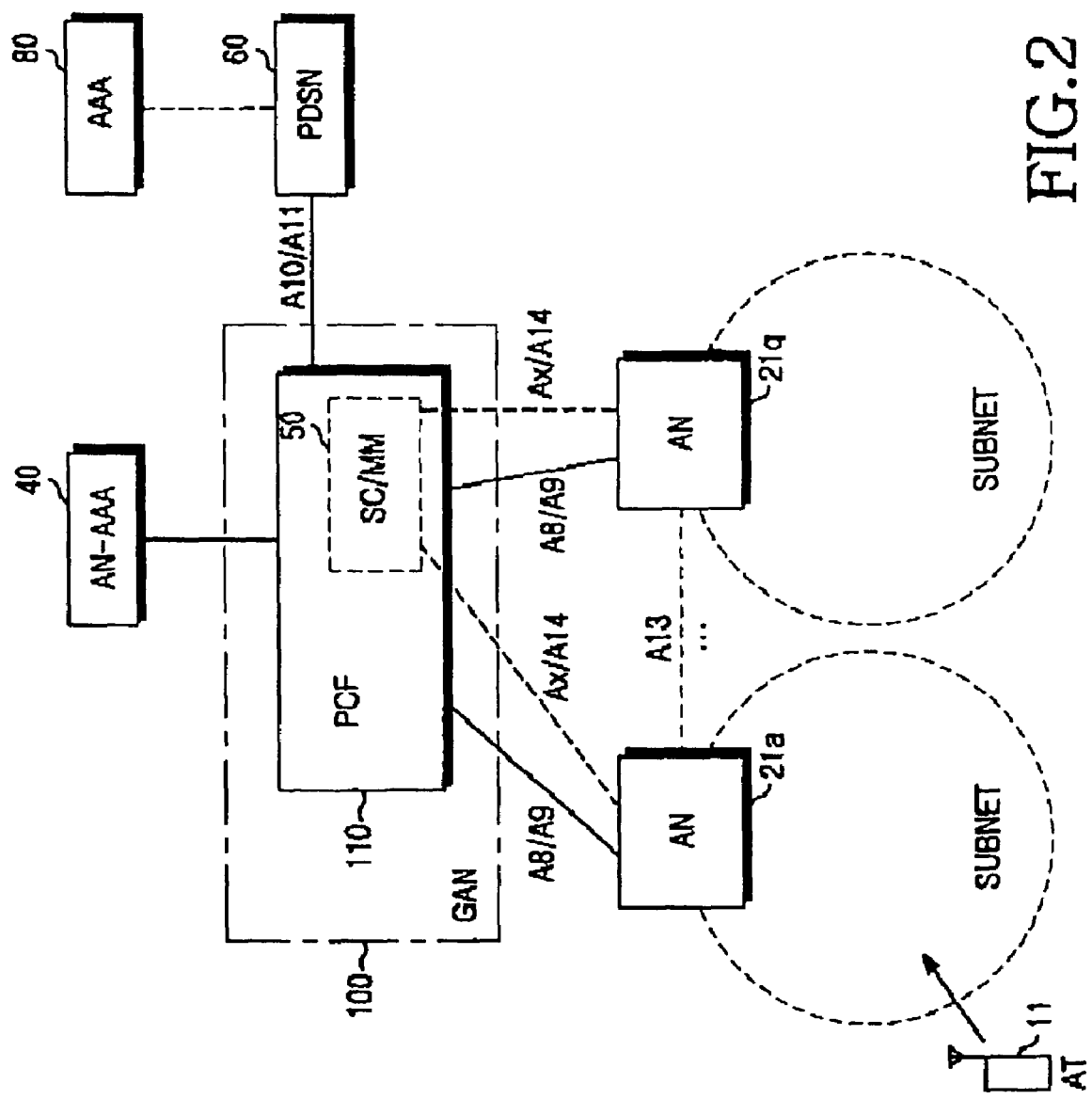
FIG. 2 is a simplified view illustrating systems for managing information about mobile terminals illustrated in FIG. 1.

FIG. 2 is a simplified view illustrating systems for managing information about ATs illustrated in FIG. 1. Referring to FIG. 2, a subnet is defined for each of ANs 21a to 21q. They are connected to one another by A 13 (SC/MM in source PCF-SC/MM in target PCF) under discussion for standardization. The subnet is similar in concept to the coverage area of a base station in the sense that location registration and handoff similar to a voice call handoff are implemented on a subnet basis, though the subnet is not identical to the coverage area in its strict sense. The subnets of the ANs 21a to 21q have different areas depending on their radio propagation distances. The ANs 21a to 21q have information about the UATIs (Unicast Access Terminal Identifiers) of ATs. A UATI is temporarily assigned to an AT attached to an AN, as compared to an IMSI (International Mobile Subscriber Identity) being a unique number permanently assigned to a mobile terminal in the existing systems supporting voice service. The ANs 21a to 21q temporarily preserve information about the sessions of the ATs. Session will be described in more detail in connection with the SC/MM 50. The subnets of the ANs 21a to 21q are identified by their color codes. Here, the color codes are comprised of a lower 8 bit of the subnet mask consisted of 128 bit. Therefore, it can be determined whether or not the subnet moves by using the color code, without using the 128 bit subnet mask.

The ANs 21a to 21q each are connected to a PCF 110 in the GAN 100 by A8/A9 (AN-PCF) under discussion for standardization, which will not be described here.

As described above, the SC/MM 50 may be located inside or outside the PCF 110. This is implementation-dependent. The SC/MM 50 illustrated in FIG. 2 is identical to the DLR 50 illustrated in FIG. 1. It is to be noted that the different names of the same entity have nothing to do with the provision of the entity inside or outside the GAN 110. Similarly, with respect to the HLR, the SC/MM 50 stores mobile information containing information about mobile locations, services used, and service class, and subscriber information. The SC/MM 50 is connected to the ANs 21a to 21q by Ax/A14 (AN-SC/MM in PCF) under discussion for standardization, for assigning UATIs to ATs and performing authentication.

A description will be made of packet data transmission and reception when the AT 11 enters the subnet of the AN 21a in the thus-constituted system. When entering the subnet of the AN 21a, the AT 11 identifies the subnet by means of a 124-bit subnet mask and a 128-bit sector ID received from the AN 21a. When AT 11 moves to another subnet, AT 11 can readily sense the movement using an 8-bit color code. The AN 21a assigns a UATI to the AT 11 and then receives the session information of the AT 11 from the SC/MM 50 by the Ax/A14 connection. According to the session information, the AN 21a performs authentication for the AT 11 and establishes a session for the AT 11. Then a packet data service is provided to the AT 11.

Figure 3:
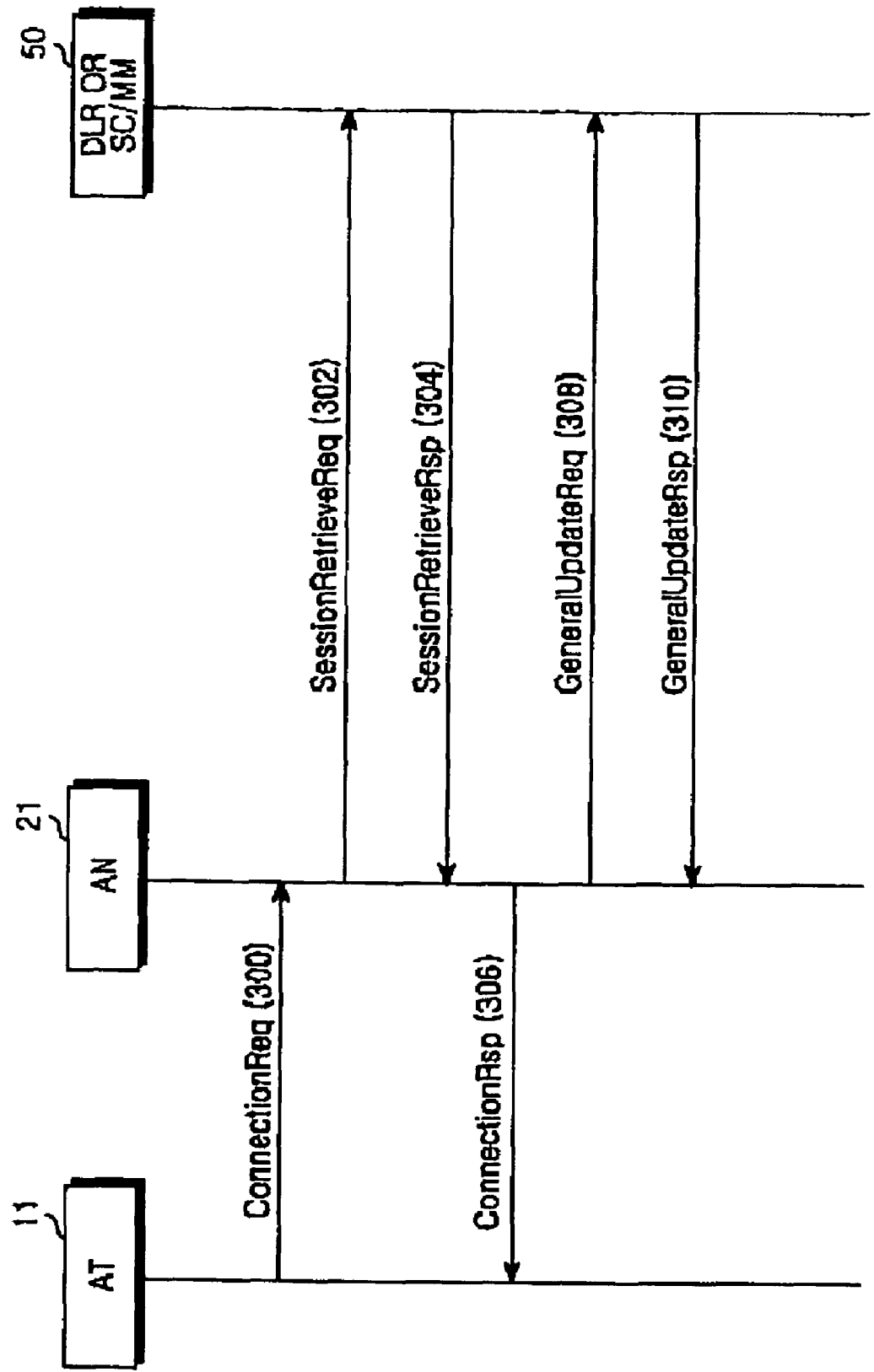
FIG. 3 is a diagram illustrating a signal flow for session information update in a mobile communication system supporting high-rate data transmission according to an embodiment of the present invention.

FIG. 3 is a diagram illustrating a signal flow for session information update in a mobile communication system supporting high-rate data transmission according to an embodiment of the present invention. The signal flow and signals used for the session information update will be described below. Here, the mobile communication system is based on IOS (Inter-Operability Specification)

Upon generation of packet data to be transmitted, or when an authentication process is needed, the AT 11 transmits to an AN 21 a ConnectionReq message requesting a connection to the AN 21 in step 300. Since the AN 21 includes an ANTS and an ANC, data and signal transmission between the AT 11 and the AN 21 is carried out wirelessly. Between the ANTS and the ANC, data and signal transmission is carried out on a wired channel. The ANC generally takes charge of analyzing each signal and performing its related process, though the ANTS can be configured to carry out the same function.

To acquire information about the AT 11, the AN 21 transmits to the SC/MM (or DLR) 50 a SessionRetrieveReq message requesting session retrieval in step 302. The SessionRetrieveReq message is configured as illustrated in Table 1. In Table 1, M represents mandatory and O represents optional.

TABLE 1

| Information Element | Type |
| --- | --- |
| Message Type | M |
| Message Length | M |
| TID | M |
| UATI | M |
| Location Registration | M |
| Authentication Parameter | O |

Referring to Table 1, Message Type indicates that a transmitted message requests session retrieval, Message Length indicates the whole length of the message, TID (Transaction IDentifier) identifies an AT to which the message is directed according to transactions, UATI is the UATI of the AT, and Location Registration indicates the subnet in which the AT is located.

TID is formed to have 32 bits as illustrated in Table 2.

TABLE 2

| 7 | 6 | 5 | 4 | 3 | 2 | 1 | 0 | Octet |
|---|---|---|---|---|---|---|---|---|
| | | | TID | | | | | 1 |
| | | | | | | | | 2 |
| | | | | | | | | 3 |
| | | | | | | | | 4 |

UATI is formed as illustrated in Table 3.

TABLE 3

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | UATI | | | | | 3 |
| | | | | | | | | 4 |

Referring to Table 3, the UATI field is in turn segmented into three fields: Element Identifier, Length, and UATI. Element Identifier indicates that the following fields provide UATI information, Length indicates the whole length of the UATI field, and UATI provides an actual UATI. The 4-octet UATI in Table 3 is specified in Table 4.

TABLE 4

| 7 | 6 | 5 | 4 | 3 | 2 | 1 | 0 | Octet |
|---|---|---|---|---|---|---|---|---|
| | | | H'00 | | | | | 1 |
| DLR ID (UATI[23:21]) | | | UATI [20:0] | | | | | 2 |
| | | | | | | | | 3 |
| | | | | | | | | 4 |

Referring to Table 4, the first three bits in octet 2 are assigned to a DLR ID for the AT, and the other five bits of octet 2 and octets 3 and 4, that is, a total of 21 bits are assigned to the UATI of the AT.

Location Registration in the SessionRetrieveReq message is formed as illustrated in Table 5.

TABLE 5

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | ANC ID | | | | | 3 |
| | | | ANTS ID | | | | | 4 |

Referring to Table 5, Location Registration contains an 8-bit Element Identifier identifying the Location Registration field, Length indicating the whole length of the Location Registration field, ANC ID indicating the ID of an ANC, and ANTS ID indicating the ID of an ANTS.

Finally, Authentication Parameter in the SessionRetrieveReq message is divided into Security Layer Packet in Table 6 and Sector ID in Table 7. Security Layer Packet, including a protocol header and a trailer, is used for the AN to verify the validness of a packet received from the AT. Sector ID is 128 bits and indicates the address of a sector that has received the ConnectionReq message.

TABLE 6

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| MSB | | | | | | | | 3 |
| | | | Security Layer packet | | | | | . |
| | | | | | | | | . |
| | | | | | | | LSB | N |

As noted from Table 6. Security Layer Packet occupies one or more octets.

TABLE 7

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | Sector ID | | | | | 3 |
| | | | | | | | | . |
| | | | | | | | | . |
| | | | | | | | | N |

When Time Stamp is included in the Authentication Parameter field, it is formed as illustrated in Table 8.

TABLE 8

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | Time Stamp | | | | | 3 |
| | | | | | | | | . |
| | | | | | | | | . |
| | | | | | | | | N |

Returning to FIG. 3, upon receipt of the SessionRetrieveReq message having fields illustrated in Table 2 to Table 8, the SC/MM 50 checks information about the AT 11 and transmits to the AN 21 a SessionRetrieveRsp message in step 304. The SessionRetrieveRsp message is configured as illustrated in Table 9, where M represents mandatory and O represents optional.

TABLE 9

| Information Element | Type |
|---|---|
| Message Type | M |
| Message Length | M |
| TID | M |
| RET | M |
| MN ID | O |
| Paging Parameter | O |
| QoS Parameter | O |
| Session Configuration Records | O |
| MS InfoRecord | O |
| HW ID | O |

Referring to Table 9, The SessionRetrieveRsp message includes Message Type, Message Length, TID, RET (REturn), MN ID (Mobile Node ID), Paging Parameter, QoS Parameter, Session Configuration Records, MS InfoRecord, and HW ID (HardWare ID). Message Type indicates that the transmitted message is a SessionRetrieveRsp message, Message Length indicates the whole length of the message, and TID is a transaction ID formed as in Table 2.

RET reports the reception result of the SessionRetrieveReq message and is formed as illustrated in Table 10.

TABLE 10

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | RET Value | | | | | 3 |

RET Value in Table 10 is specified in Table 11 and Table 12.

TABLE 11

| Class | Binary Value | Meaning |
|---|---|---|
| Normal | B'0000~B'0001 | Success |
| | | Deliver necessary information |
| Resource | B'0010 | Failure due to shortage of resources |
| Processing | B'0011~B'0100 | Service-related failure |
| Message Invalid | B'0101 | Failure in message delivery due to invalid message or TID error-caused wrong destination |
| Protocol Error | B'0110 | Failure due to parameter error |
| Authentication Failure | B'0111 | Authentication failed |
| Reserved | B'1000~B'1110 | Unused |
| ETC | B'1111 | Other failures |

Referring to Table 11, 4 upper bits of the RET Value field represent a class, considering the possibility of further defining RET values. The classes of RET Value are defined in more detail in Table 12.

TABLE 12

| Class | RET Value | Name | Meaning |
|---|---|---|---|
| Normal | H'01 | SUCCESS | Success |
| | H'02 | DUPLICATED_UATI | Different UATIs for same MN ID |
| Resource | H'21 | NO_UATI_AVAILABLE | Shortage of available UATI resources |
| Processing | H'31 | UNKNOWN_UATI | Received UATI different from assigned UATI |
| | H'32 | AUTHENTICATION_FAILED | Failure in SHA-1 authentication of IS-856 |
| | H'33 | STALE_OLDUATI | No MN ID or session for received old UATI |
| | H'34 | MN_ID_MISMATCHED | Received MN ID different from stored MN ID |
| | H'35 | LOC_UNAVAILABLE | Unclear AT location |
| Processing | H'41 | INVALID_MESSAGE_TYPE | Invalid message type |
| | H'42 | MANDATORY_ELEMENT_OMITTED | Mandatory element omitted |
| | H'43 | UNKNOWN_ELEMENT | Unknown element received |
| | H'44 | INVALID_ELEMENT | Invalid parameter |
| | H'4F | GENERAL_PROTOCOL_ERROR | Other protocol-related failures |
| PPS | H'51 | PPS_NOT_OK | No limit on PPS subscriber |
| ETC | H'FF | GENERAL_ERROR | Other failures |

From RET Value in RET, the AN 21 determines whether the SessionRetrieveReq message has been received successfully in the SC/MM 50.

MN ID in the SessionRetrieveRsp message is formed as illustrated in Table 13.

TABLE 13

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| Identity Digit 1 | | | | Odd/Even Indicator | Type of Identity | | | 3 |
| Identity Digit 3 | | | | Identity Digit 2 | | | | 4 |
| . | | | | . | | | | . |
| . | | | | . | | | | . |
| Identity Digit N + 1 | | | | Identity Digit N | | | | N |

Table 14 lists Type of Identity values and their meanings.

TABLE 14

| Binary Values | Meaning |
|---|---|
| 000 | No identity code |
| 001 | MIN |
| 010 | Broadcast Address |
| 101 | ESN |
| 110 | IMSI |

Referring to Table 14, different values are defined by setting different binary values of Type of Identity. MIN represents Mobile station Identification Number, Broadcast Address is used for a broadcast service, ESN represents Electronic Serial Number, and IMSI represents International Mobile Subscriber Identity.

Paging Parameter in the SessionRetrieveRsp message is formed as illustrated in Table 15.

TABLE 15

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | Paging Parameter | | | | | 3 |
| | | | | | | | | 4 |
| | | | | | | | | . |
| | | | | | | | | . |
| | | | | | | | | . |
| | | | | | | | | N |

Table 16 below illustrates QoS Parameter in the SessionRetrieveRsp message.

TABLE 16

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | QoS Parameter | | | | | 3 |
| | | | | | | | | 4 |
| | | | | | | | | . |
| | | | | | | | | . |
| | | | | | | | | . |
| | | | | | | | | N |

Table 17 and 18 illustrate the Session Configuration Records and MS InfoRecord fields, respectively in the SessionRetrieveRsp message.

TABLE 17

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | Session Configuration Records | | | | | 3 |
| | | | | | | | | 4 |
| | | | | | | | | . |
| | | | | | | | | . |
| | | | | | | | | . |
| | | | | | | | | N |

TABLE 18

| 7 | 6 | 5 | 4 | 3 | 2 | 1 | 0 | Octet |
|---|---|---|---|---|---|---|---|---|
| | | | Element Identifier | | | | | 1 |
| | | | Total Length | | | | | 2 |
| | | | MS Information Record Type | | | | | 3 |
| | | | MS Information Record Length | | | | | 4 |
| | | | MS Information Record Value | | | | | 5 |

Each element in the MS InfoRecord field occupies one octet. MS Information Record Value is specified in Table 19.

TABLE 19

| MSIR Values | Name | Meaning |
|---|---|---|
| H'01 | WIN_Subs | Win subscriber |
| H'02 | AllTrig_Subs | All Trigger subscriber |
| H'03 | HomeZone_Subs | Home Zone subscriber |

In Table 19, MSIR represents MS Information Record. MS InfoRecord is a parameter for subscribers to an intelligent network service provided by a Korean mobile service provider, KTF. At present, one MS Information Record type, one MS Information Record Length, and one MS Information Record Value are in use for the service. The same thing is applicable to a system providing the same service.

Table 20 illustrates the HW ID field in the SessionRetrieveRsp message.

TABLE 20

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | HW ID | | | | | 3 |
| | | | | | | | | 4 |
| | | | | | | | | 5 |
| | | | | | | | | 6 |

Returning to FIG. 3, upon receipt of the thus-configured SessionRetrieveRsp message from the SC/MM 50, the AN 21 transmits to the AT 11 a ConnectionRsp message in response for the ConnectionReq message in step 306.

Then, when the AN 21 detects the MN ID of the AT 11 or a session update is required for the AT 11, it transmits to the SC/MM 50 a GeneralUpdateReq message requesting a general session update by the A14 connection in step 308. The GeneralUpdateReq message has a structure as illustrated in Table 21 where M represents mandatory and O represents optional.

TABLE 21

| Information Element | Type |
|---|---|
| Message Type | M |
| Message Length | M |
| TID | M |
| REG_TYPE | M |
| MN ID | O |
| PDSN IP Address | O |
| Access Network Identifier | O |
| Authentication Keys | O |
| Paging Parameter | O |
| QoS Parameter | O |
| Session Configuration Records | O |
| Location Registration | O |
| CLIM Indicator | O |
| MS InfoRecord | O |

In Table 21, CLIM represents Credit Limit Management. REG_TYPE is a field constructed as illustrated in Table 22. Indicating registration type of the General Update Request Message.

TABLE 22

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | REG_TYPE Value | | | | | 3 |

REG_TYPE Value is specified in Table 23.

TABLE 23

| REG_TYPE Value | Name | Meaning |
|---|---|---|
| H'01 | Route_Upt | Location information in case of distance-based location registration |
| H'02 | Conn_Close | Location information in case of general call release |

TABLE 23-continued

REG_TYPE

| Value | Name | Meaning |
|---|---|---|
| H'03 | Session_Nego | Session information and location information in case of call release after session negotiations |
| H'04 | IMSI | IMSI received from AN AAA |
| H'05 | QoS | Changed QoS parameter |
| H'06 | 1x-1xEV-DO__DorHO | Delivered from ANC to DLR to acquire IMSI in case of 1x-1xEV-DO dormant handoff |

As illustrated in Table 23, REG_TYPE values are defined using 4 lower bits assigned to the REG_TYPE Value field, considering the possibility of further defining REG_TYPE values.

The PDSN IP Address and Access Network Identifier fields in the GeneralUpdateReq message are formed as illustrated in Table 24 and Table 25, respectively.

TABLE 24

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | PDSN IP Address | | | | | 3 |
| | | | | | | | | 4 |
| | | | | | | | | 5 |
| | | | | | | | | 6 |

TABLE 25

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| Reserved | | | | SID | | | | 3 |
| | | | | | | | | 4 |
| | | | NID | | | | | 5 |
| | | | | | | | | 6 |
| | | | PZID | | | | | 7 |

In Table 25, SID is a system identifier that discriminates between a cellular system and a PCS system. NID (Network IDentifier) identifies a cellular network or a PCS network. PZID (Packet Zone IDentifier) indicates a PCF coverage area within a particular system or network indicated by SID/NID.

The Authentication Keys and CLIM Indicator fields of the GeneralUpdateReq message are formed as illustrated in Table 26 and Table 27, respectively.

TABLE 26

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| | | | ACAuthKey | | | | | 3 |
| | | | | | | | | 4 |
| | | | | | | | | . |
| | | | | | | | | . |
| | | | | | | | | 22 |

TABLE 27

| 7 | 6 | 5 | 4 | 3 | 2 | 1 | 0 | Octet |
|---|---|---|---|---|---|---|---|---|
| | | | Element Identifier | | | | | 1 |
| | | | Length | | | | | 2 |
| MSB | | | SID | | | | | 3 |
| | | Vendor ID = [5806 or 00 00 16 AE] | | | | | | 4 |
| | | | | | | | | 5 |
| | | | | | | | LSB | 6 |
| | | | Vendor Type = 01H | | | | | 7 |
| | | | Vendor Length = 06H | | | | | 8 |
| MSB | | | | | | | | 9 |
| | | Vendor Value (variable number of octets) | | | | | | 10 |
| | | | | | | | | . |
| | | | | | | | | . |
| | | | | | | | LSB | N |

The CLIM indicator illustrated in Table 27 is applied only to a PPS service provided by a Korean mobile service provider, SKT. It indicates whether the AT is a PPS subscriber or not. If Vendor Value is 0, it indicates a general subscriber. If Vendor Value is 1, it indicates a PPS subscriber. The same thing is available to a service provider that provides a service in the same manner as the PPS service of SKT.

The AN 21 transmits to the SC/MM 50 the GeneralUpdateReq message configured as illustrated in Table 22 to Table 27. After collecting information about the AT 11, the SC/MM 50 generates a GeneralUpdateRsp message representing the session information of the AT 11 and transmits it to the AN 21 in step 310. If the AN 21 requests the SC/MM 50 to remove the session information of the AT 11, it transmits to the SC/MM 50 a SessionCloseReq message by the A14 connection. When completely clearing the session information, the SC/MM 50 transmits a SessionCloseRsp message to the AN 21. The session close request and response will be described later in detail with reference to FIG. 5.

The GeneralUpdateRsp message is configured as illustrated in Table 28.

TABLE 28

| Information Element | Type |
|---|---|
| Message Type | M |
| Message Length | M |
| TID | M |
| RET | M |
| MN ID | O |

The SC/MM 50 transmits to the AN 21 the thus-configured GeneralUpdateRsp message. Thus it manages the information about the AT 11.

Figure 4:
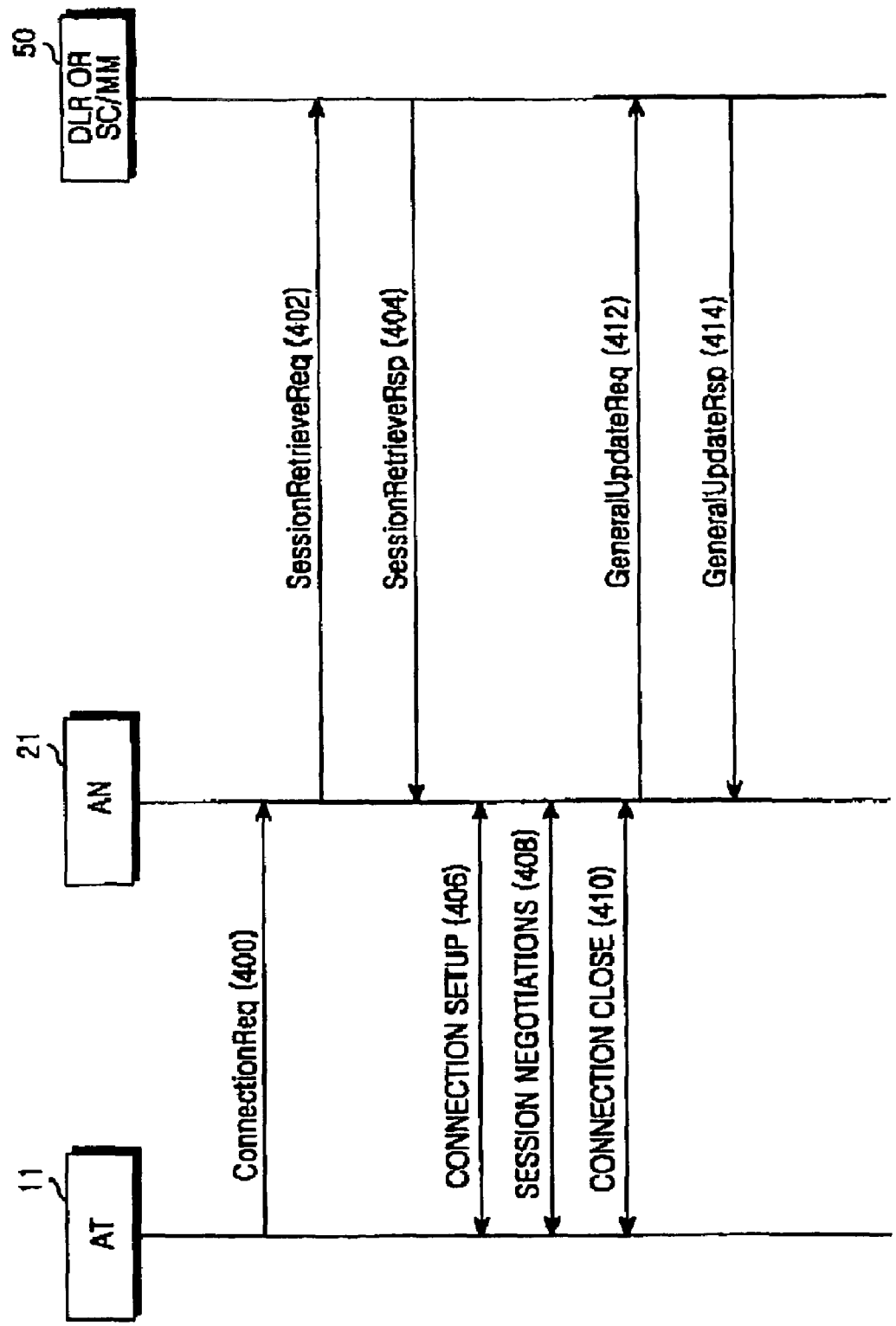
FIG. 4 is a diagram illustrating a signal flow for session negotiations in the mobile communication system supporting high-rate data transmission according to the embodiment of the present invention.

FIG. 4 is a diagram illustrating a signal flow for session negotiations in the mobile communication system supporting high-rate data transmission according to the embodiment of the present invention.

Referring to FIG. 4, when session negotiations is required, or transmission data arrives, the AT 11 transmits a ConnectionReq message to the AN 21 in step 400. The AN 21 transmits a SessionRetrieveReq message to the SC/MM 50 in step 402. Then the SC/MM 50 transmits a SessionRetrieveRsp message to the AN 21 in step 404. Steps 400, 402, and 403 are performed with the same messages in the same manner as steps 300, 302 and 304 illustrated in FIG. 3. Therefore, their detailed description is not provided here.

Then, the AT 11 and the AN 21 set up a connection when necessary in step 406. If the AN 21 has received the session information of the AT 11 in the SessionRetrieveRsp message, it performs session negotiations normally in step 408. On the other hand, if the AN 21 fails to receive the session information, it sets up a necessary protocol according to a Session-ConfigurationToken value received from the AT 11 and prepares for session negotiations. Then the AN 21 transmits a ConfigurationStart message to the AT 11 and the AT 11 transmits a ConfigurationRequest message to the AN 21. The AN 21 then carries out the session negotiations in step 408.

If the session negotiations is completed, the AN 21 performs a connection close procedure in step 410 and transmits to the SC/MM 50 a GeneralUpdateReq message representing the negotiation result in step 412. The SC/MM 50 stores the session information of the AT 11 in its database.

If the SC/MM 50 has a tuple corresponding to a UATI in the received message, it updates the MN ID, session information, and location registration information of the tuple in its database. If the SC/MM 50 receives an MN ID without a UATI in the GeneralUpdateReq message, it compares the MN ID with tuples in the database. If a tuple having the same MN ID is present in the database, the SC/MM 50 discards this tuple from the database.

In step 414, the SC/MM 50 transmits a GeneralUpdateRsp message to the AN 21. If a tuple having the session information set in the GeneralUpdateReq message is not found in the database, the SC/MM 50 sets RET to SUCCESS in the GeneralUpdateRsp message.

Figure 5:
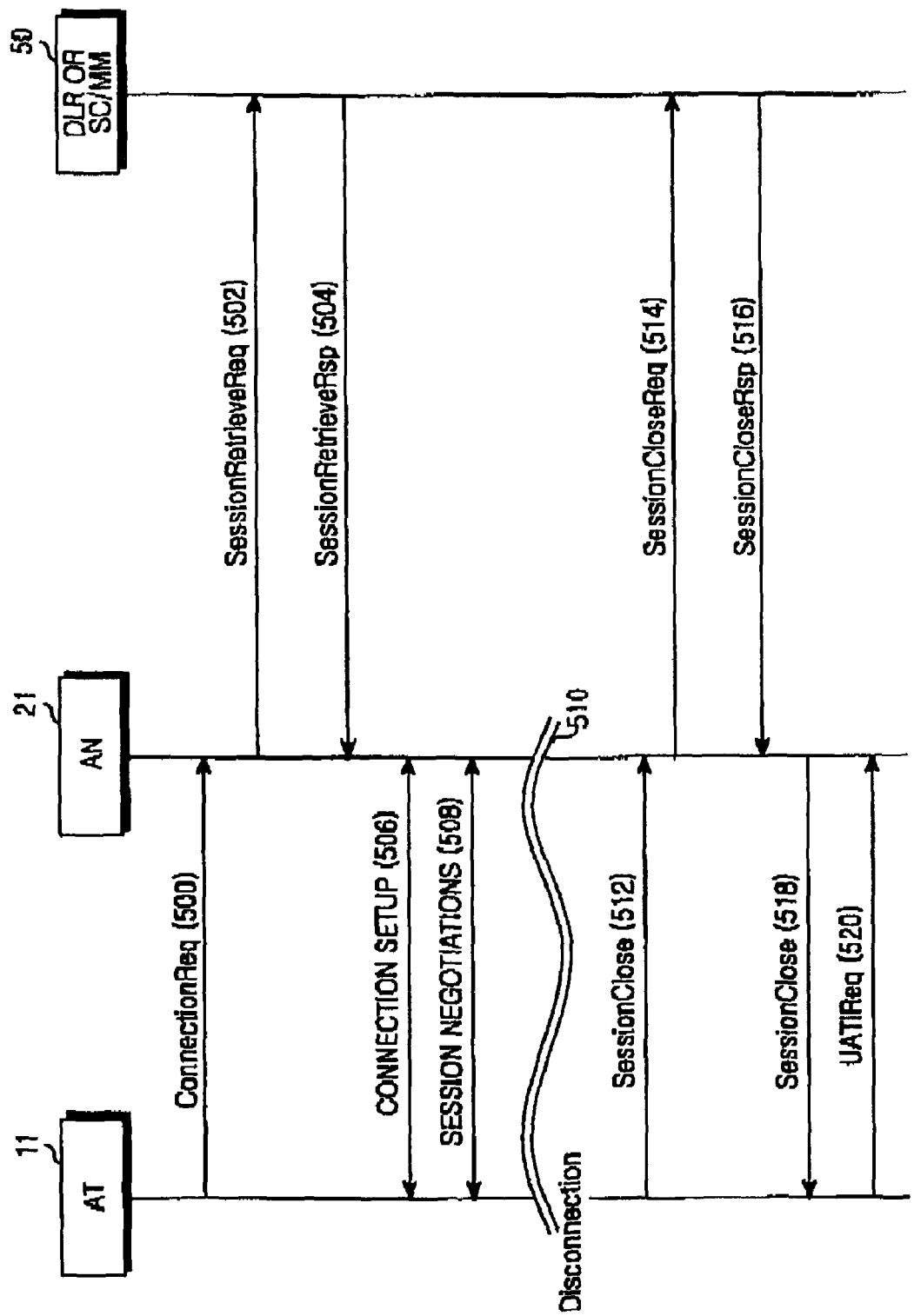
FIG. 5 is a diagram illustrating a signal flow in the case of a connection release during session negotiations in the mobile communication system supporting high-rate data transmission according to the embodiment of the present invention.

FIG. 5 is a diagram illustrating a signal flow when the connection between the AT 11 and the AN 21 is released during session negotiations in the mobile communication system supporting high-rate data transmission according to the embodiment of the present invention.

Referring to FIG. 5, steps 500 to 508 are the same as steps 400 to 408 illustrated in FIG. 4. The AT 11 may be disconnected from the AN 21 during the session negotiations in step 508. The disconnection leads to a negotiations failure. For example, if the AT 11 is power-off, or a reverse link is lost, the negotiations is failed. If the AT 11 can resume the communications such as upon power-on or in case of recovery of the reverse link, it transmits a SessionClose message to the AN 21, thereby releasing its UATI in step 512. The AN 21 then transmits a SessionCloseReq message to the SC/MM 50 in step 514. After storing information indicating the session closure in the database, the SC/MM 50 transmits a SessionCloseRsp message to the AN 2 in step 516. In step 518, the AN 21 transmits a SessionClose message to the AT 11, notifying the session closure.

In stop 520, the AT 11 transmits a UATIReq message to the AN 21, requesting a UATI again. Subsequent steps are performed in the same manner as for initial opening of a session.

In accordance with the present invention as described above, the session information of ATs is managed by the use of a SC/MM in the 1xEV-DO system. Since the SC/MM manages a session in conjunction with an AN, the session information is efficiently updated and stored.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of managing the session information of an access terminal (AT) in a communication system that includes a session controller and mobility manager (SC/MM), a plurality of access networks (ANs), and a plurality of ATs wirelessly communicable with the ANs, the method comprising the steps of:

upon receipt of a Connection Request message from the AT, transmitting to the SC/MM a Session Retrieve Request message by an AN;

upon receipt of the Session Retrieve Request message from the AN, searching for session information of the AT, and transmitting to the AN a Session Retrieve Response message including the session information by the SC/MM, wherein the SC/MM is communicably coupled to a Packet Data Serving Node (PDSN);

upon receipt of the Session Retrieve Response message, transmitting to the AT a Connection Response message by the AN:

transmitting to the SC/MM a General Update Request message including session information of the AT after transmitting the Connection Response message to the AT by the AN in case the AN detects a MN ID of the AT or a session update is required for the AT; and upon receipt of the General Update Request message, updating the session information of the AT and transmitting to the AN a General Updaate Response message by the SC/MM.

2. The signaling method of claim 1, wherein the Session Retrieve Request message includes Message Type, Message Length, TID (Transaction IDentifier), UATI (Unicast Access Terminal Identifier), and Location Registration information indicating the subnet in which the AT is located.

3. The signaling method of claim 2, wherein the Session Retrieve Request message further includes Authentication parameter.

4. The signaling method of claim 1, wherein the Session Retrieve Response message includes Message Type, Message Length, TID (Transaction IDentifier), and RET value indicating the reception result of the Session Retrieve Request message.

5. The signaling method of claim 4, wherein the Session Retrieve Response message further includes MN ID (Mobile Node Identifier), Paging Parameter, QoS Parameter, Session Configuration Records, MS InfoRecord indicating what kind of subscriber the MS is, and HW ID (HardWare Identifier).

6. The method of claim 1, wherein the General Update Request message includes Message Type, Message Length, TID(Transaction Identifier), REG_TYPE indicating what kind of registration the General Update Request message means, and UATI(Unicast Access Terminal Identifier).

7. The method of claim 6, wherein the General Update request message further includes MN ID, PDSN(Packet Data Service Node) IP Address, Access Network Identifier, Authentication Keys, Paging Parameter, QoS (Quality of Service) Parameter, Session Configuration Records, Location Registration information indicating the subnet in which the AT is located, CLIM (Credit Limit Management) Indicator, and MS InfoRecord indicating what kind of subscriber the MS is.

8. The method of claim 1, wherein the General Update Response message includes Message Type, Message Length, TID, and RET indicating the reception result of the General Update Request message.

9. The method of claim 8, wherein the General Update Response message further includes MN ID.

10. The method of claim 1, further comprising the steps of:

preparing for session negotiations with the AT by the AN in the absence of the session information of the AT in the Session Retrieve Response message; and carrying out session negotiations with the AT by transmitting to the AT a Configuration Start message by the AN.

11. The method of claim 10, further comprising the step of performing a Connection Close procedure by the AN when the session negotiations is completed.

12. The method of claim 10, further comprising the steps of;
awaiting reception of a Session Close message from the AT by the AN when the AN fails the session negotiations;
upon receipt of the Session Close message from the AT, transmitting to the SC/MM a Session Close Request message by the AN; and
upon receipt of a Session Close Response message from the SC/MM, transmitting to the AT a Session Close message by the AN.

13. The method of claim 12, further comprising the step of, upon receipt of the Session Close message from the AN, transmitting to the AN a UATI (Unicast Access Terminal ID) Request message by the AT.

14. The method of claim 1, wherein upon generation of packet data to be transmitted, the AT transmits the Connection Request message to the AN.

15. The method of claim 1, wherein if authentication is required, the AT transmits the Connection Request message to the AN.

* * * * *